(12) United States Patent
McCurry

(10) Patent No.: US 11,613,040 B2
(45) Date of Patent: Mar. 28, 2023

(54) CIRCULAR SAW WITH ADJUSTABLE BASE

(71) Applicant: TECHTRONIC CORDLESS GP, Anderson, SC (US)

(72) Inventor: Ronald C. McCurry, West Union, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 0 days.

(21) Appl. No.: 17/540,540

(22) Filed: Dec. 2, 2021

(65) Prior Publication Data

US 2022/0184843 A1 Jun. 16, 2022

Related U.S. Application Data

(60) Provisional application No. 63/124,183, filed on Dec. 11, 2020.

(51) Int. Cl.
*B27B 9/02* (2006.01)
*B23D 59/00* (2006.01)
*B23D 45/16* (2006.01)
*B23D 45/04* (2006.01)

(52) U.S. Cl.
CPC .............. *B27B 9/02* (2013.01); *B23D 45/044* (2013.01); *B23D 45/16* (2013.01); *B23D 59/002* (2013.01)

(58) Field of Classification Search
CPC ........ B23D 45/16; B23D 45/068; B27B 9/00; B27B 9/02; B27B 9/04
See application file for complete search history.

(56) References Cited

U.S. PATENT DOCUMENTS

| | | | |
|---|---|---|---|
| 2,986,178 A | 5/1961 | Robert | |
| 5,427,006 A | 6/1995 | Finley | |
| 5,848,472 A | 12/1998 | Eto et al. | |
| 5,924,207 A * | 7/1999 | Price | B23D 59/003 30/376 |
| 6,691,418 B1 | 2/2004 | Lewin et al. | |

(Continued)

FOREIGN PATENT DOCUMENTS

| | | |
|---|---|---|
| CN | 202781322 U | 3/2013 |
| CN | 208358971 U | 1/2019 |

(Continued)

OTHER PUBLICATIONS

Extended European Search Report for Application No. 21213056.1 dated Jul. 14, 2022 (8 pages).

*Primary Examiner* — Jennifer S Matthews
(74) *Attorney, Agent, or Firm* — Michael Best & Friedrich LLP

(57) ABSTRACT

A method of aligning a saw unit and a base. The saw unit further includes a front bevel angle adjustment bracket proximate a front end of the base and a rear bevel angle adjustment bracket proximate a rear end of the base. The saw unit further comprises a first fastener extending through a first elongated slot in one of the base or the front bevel angle adjustment bracket and a second fastener extending through a second elongated slot in one of the base or the rear bevel angle adjustment bracket. Each of the first and second elongated slots extends along a lateral axis oriented transverse to the longitudinal axis of the base to permit lateral adjustment of the saw unit relative to the base.

4 Claims, 7 Drawing Sheets

(56) References Cited

U.S. PATENT DOCUMENTS

| | | | |
|---|---|---|---|
| 8,276,281 B2* | 10/2012 | Zhang | B23D 59/003 |
| | | | 30/376 |
| 8,438,740 B2 | 5/2013 | Fischer | |
| 9,475,140 B2* | 10/2016 | Kume | B23D 59/00 |
| 9,505,069 B2 | 11/2016 | Frolov | |
| 10,668,644 B2 | 6/2020 | Okouchi et al. | |
| 2003/0000359 A1 | 1/2003 | Eccardt et al. | |
| 2004/0107584 A1* | 6/2004 | Yoshida | B23D 59/006 |
| | | | 30/388 |
| 2005/0160608 A1* | 7/2005 | Tanimoto | B23D 59/006 |
| | | | 30/391 |
| 2006/0219075 A1 | 10/2006 | Liu et al. | |
| 2017/0326660 A1* | 11/2017 | Nakashima | B23D 59/002 |
| 2018/0071942 A1* | 3/2018 | Behr | B27B 5/206 |
| 2018/0339422 A1 | 11/2018 | Fulmer et al. | |
| 2019/0143555 A1* | 5/2019 | Nakashima | B23D 45/16 |
| | | | 30/376 |
| 2019/0217495 A1 | 7/2019 | Knight | |
| 2019/0299482 A1 | 10/2019 | Knight | |
| 2019/0388984 A1 | 12/2019 | Kuragano | |
| 2020/0086521 A1 | 3/2020 | Knight et al. | |
| 2020/0094433 A1 | 3/2020 | Knight et al. | |

FOREIGN PATENT DOCUMENTS

| | | |
|---|---|---|
| CN | 211135737 U | 7/2020 |
| EP | 0990492 A2 * | 4/2000 |
| JP | 2008080488 A | 4/2008 |
| WO | 2019047951 A1 | 3/2019 |

* cited by examiner

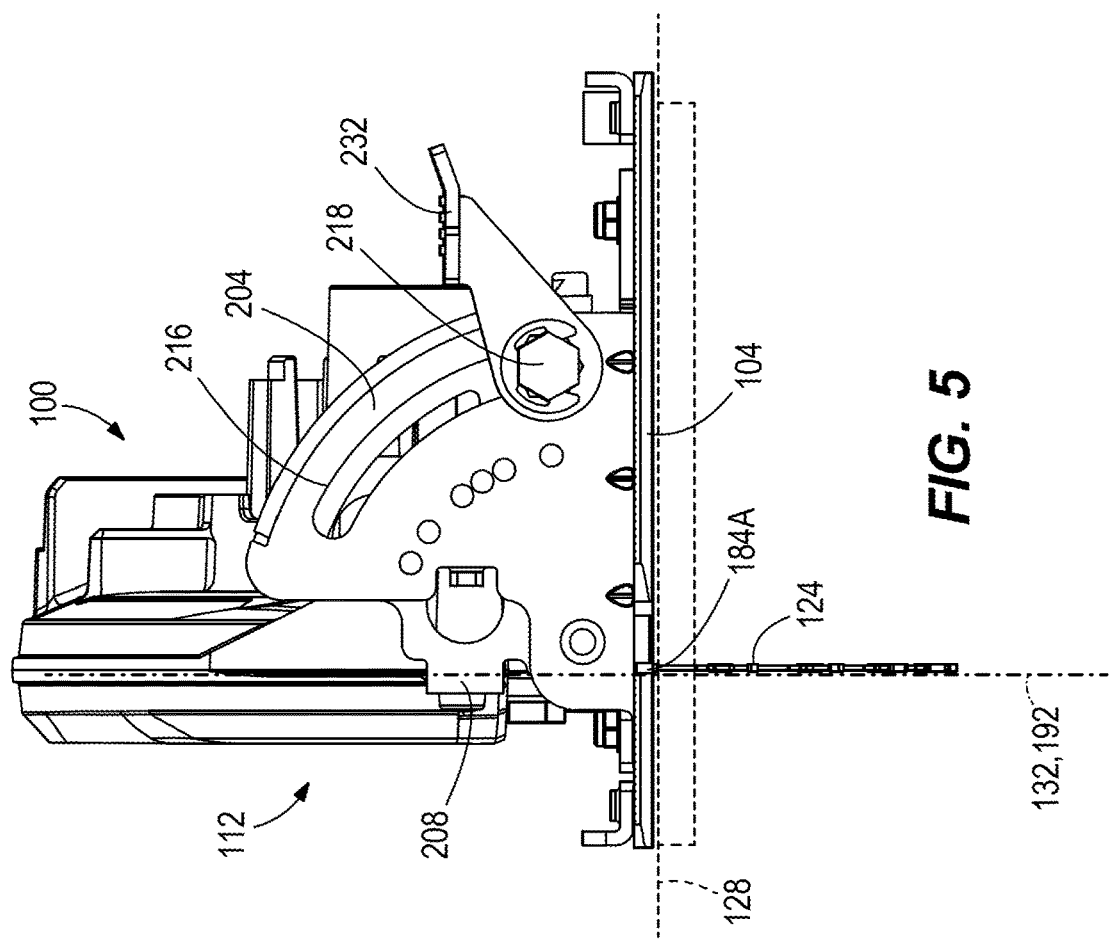
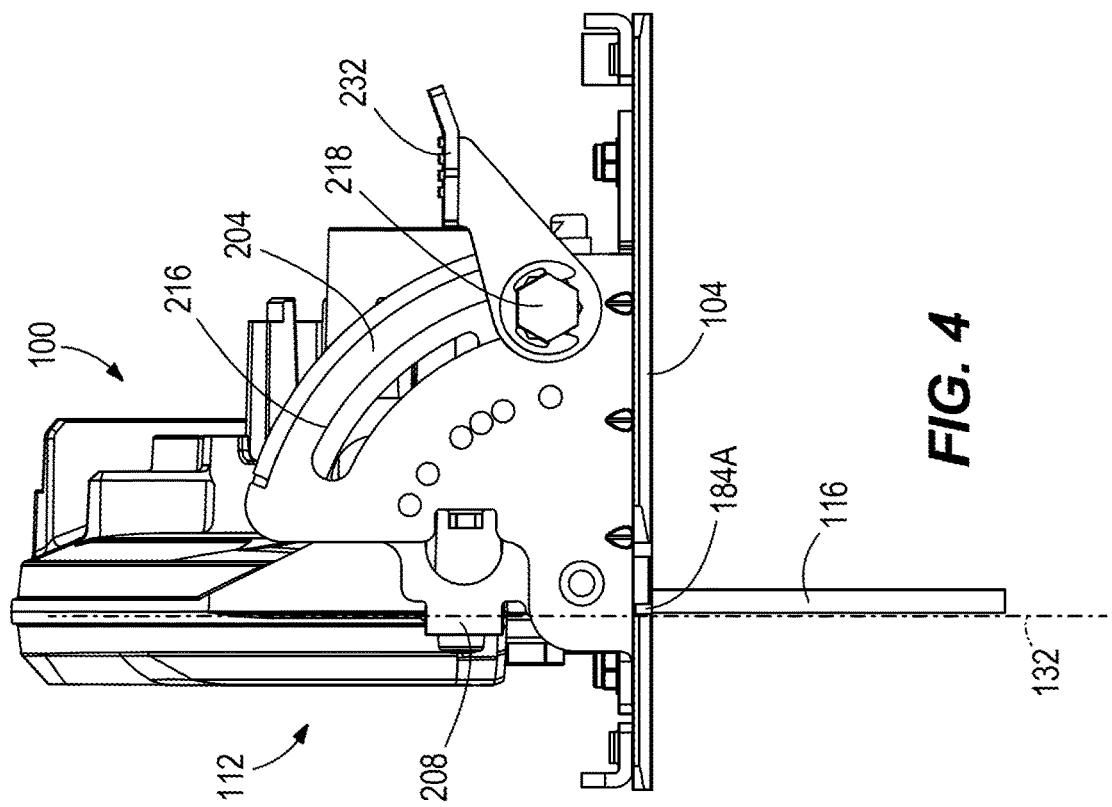

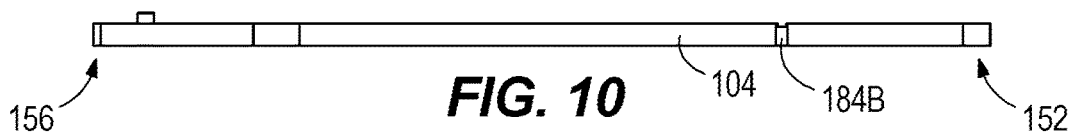
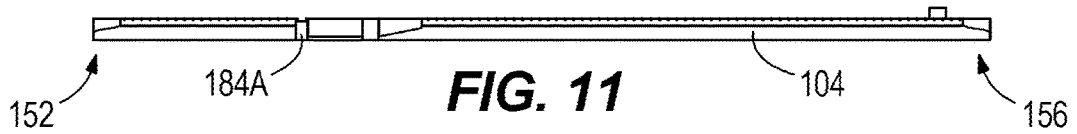
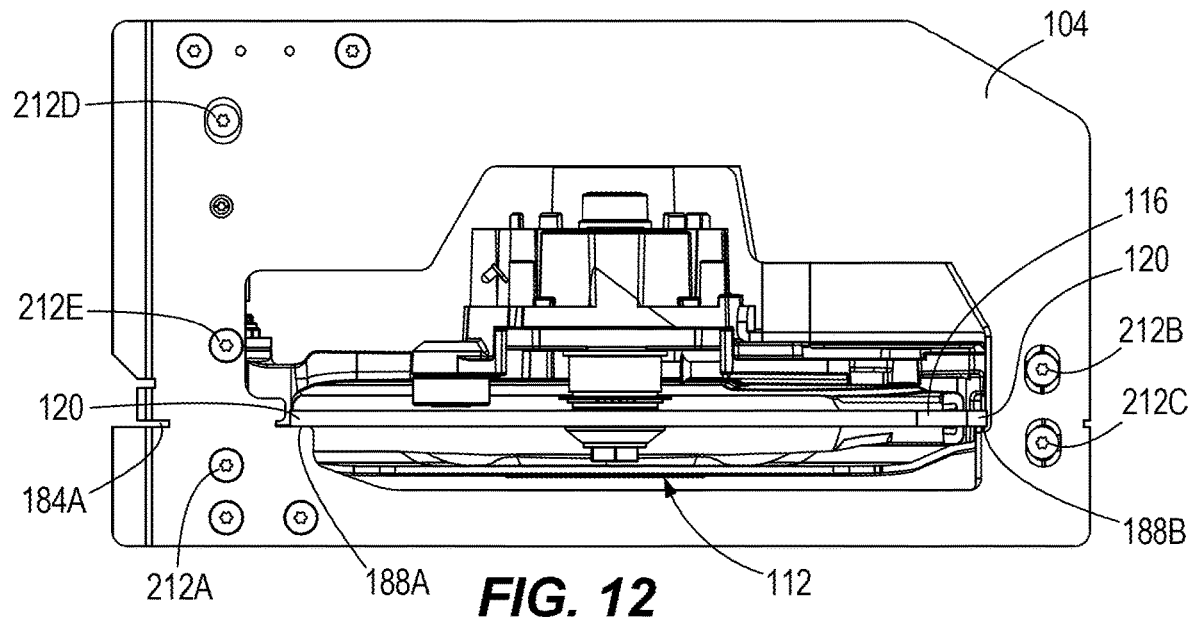
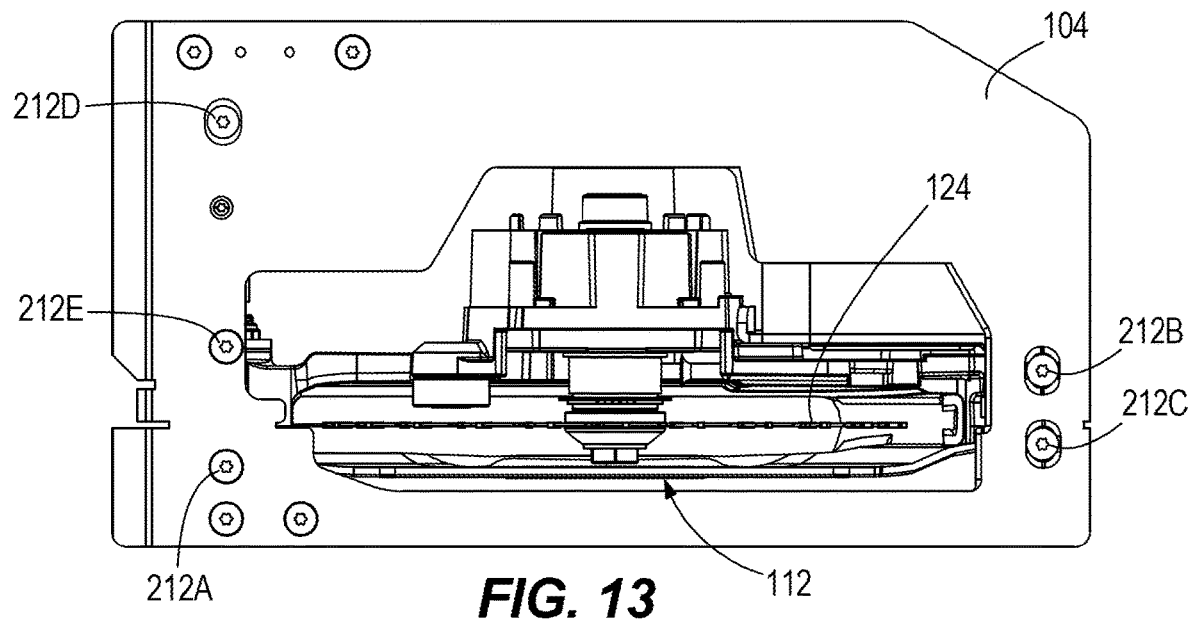

CIRCULAR SAW WITH ADJUSTABLE BASE

CROSS-REFERENCE TO RELATED APPLICATIONS

This application claims priority to U.S. Provisional Patent Application No. 63/124,183 filed on Dec. 11, 2020, the entire content of which is incorporated herein by reference.

FIELD OF THE DISCLOSURE

The present disclosure relates to power tools, and more particularly to circular saws.

BACKGROUND OF THE DISCLOSURE

Circular saws are used to make cuts in a work piece. Typically, circular saws include a base and a saw unit supported upon the base. Some circular saws allow beveling or angling of the saw unit relative to the base. Preferably, the interface between the saw unit and the base is aligned such that a blade of the saw unit is aligned with the base and a user can make a straight, beveled or non-beveled cut in the work piece.

SUMMARY OF THE DISCLOSURE

The present invention provides, in one aspect, a circular saw including a base defining a longitudinal axis, the base including an upper surface and an opposite, lower surface. The base further includes an opening extending through the base between the upper surface and the lower surface. The circular saw further includes a front bevel angle adjustment bracket proximate a front end of the base and a rear bevel angle adjustment bracket proximate a rear end of the base. The circular saw further includes a saw unit coupled to the base via the front bevel angle adjustment bracket and the rear bevel angle adjustment bracket. The circular saw further comprises a first fastener extending through a first elongated slot in one of the base or the front bevel angle adjustment bracket and a second fastener extending through a second elongated slot in one of the base or the rear bevel angle adjustment bracket. Each of the first and second elongated slots extends along a transverse axis oriented transverse to the longitudinal axis of the base to permit lateral adjustment of the saw unit relative to the base.

The present invention provides, in another independent aspect, a method of aligning a saw unit and a base of a circular saw. The method includes loosely coupling the saw unit to the base via a first bevel angle adjustment bracket proximate a front end of the base and a second bevel angle adjustment bracket proximate a rear end of the base. The method includes attaching a gauge plate to the saw unit. The method includes laterally adjusting a position and orientation of the saw unit relative to the base by sliding the first and second bevel angle adjustment brackets relative to the base until the gauge plate abuts a gauge locating surface on the base. The method further includes tightening the first and second bevel angle adjustment brackets to the base to affix the position and orientation of the saw unit relative to the base. Finally, the method includes replacing the gauge plate with a circular saw blade.

BRIEF DESCRIPTION OF THE DRAWINGS

FIG. 4 is a front view of the circular saw of FIG. 1 with a gauge plate attached to the saw unit.
FIG. 5 is a front view of the circular saw of FIG. 1 with a circular saw blade attached to the saw unit.
FIG. 10 is a rear view of the base of FIG. 8.
FIG. 11 is a front view of the base of FIG. 8.
FIG. 12 is a bottom view of the circular saw of FIG. 1 with a gauge plate attached to the saw unit.
FIG. 13 is a bottom view of the circular saw of FIG. 1 with a circular saw blade attached to the saw unit.

Before any embodiments of the disclosure are explained in detail, it is to be understood that the disclosure is not limited in its application to the details of construction and the arrangement of components set forth in the following description or illustrated in the following drawings. Also, it is to be understood that the phraseology and terminology used herein is for the purpose of description and should not be regarded as limiting.

DETAILED DESCRIPTION

Figure 1:
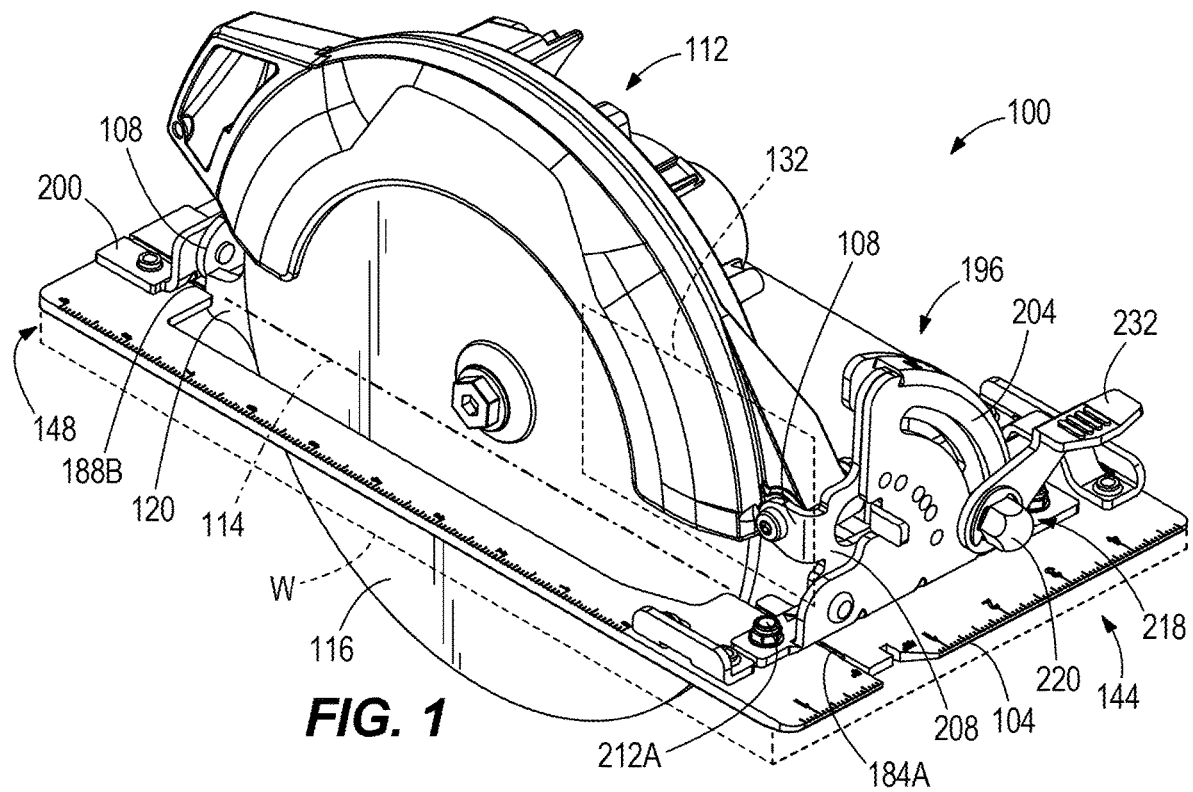
FIG. 1 is a perspective view of a circular saw.

FIG. 1 illustrates a circular saw 100 including a base 104 and a saw unit 112 mounted on the base 104 at an interface 108. During use, the base 104 of the circular saw 100 rests upon a work piece W. The base 104 includes a front end 144 and a rear end 148. A longitudinal axis 114 of the base 104 extends through the front end 144 and the rear end 148. During use, the circular saw 100 is translated along the longitudinal axis 114. During assembly, the base 104 of the circular saw 100 may be removed from the work piece W and a gauge plate 116 may be attached to the saw unit 112 of the circular saw 100.

In some embodiments, the gauge plate 116 is generally cylindrical (e.g., shaped like a saw blade but without cutting surfaces or teeth), but includes at least one radially outward-extending protrusion 120 used for aligning the gauge plate 116 and the saw unit 112 relative to the base 104, as further described below. The gauge plate 116 is removable from the saw unit 112 and a circular saw blade 124 (FIG. 5) can replace the gauge plate 116 for making a cut in a work piece W. As shown in FIGS. 4 and 5, the gauge plate 116 is generally thicker than the blade 124. With reference to FIG. 5, the base 104 defines a base plane 128. When the circular saw 100 rests on a work piece W, the base plane 128 is parallel, or substantially parallel (i.e., +/−10° from parallel) with an upper surface of the work piece W. A vertical reference plane 132 extends perpendicularly upward from the base plane 128.

Figure 2:
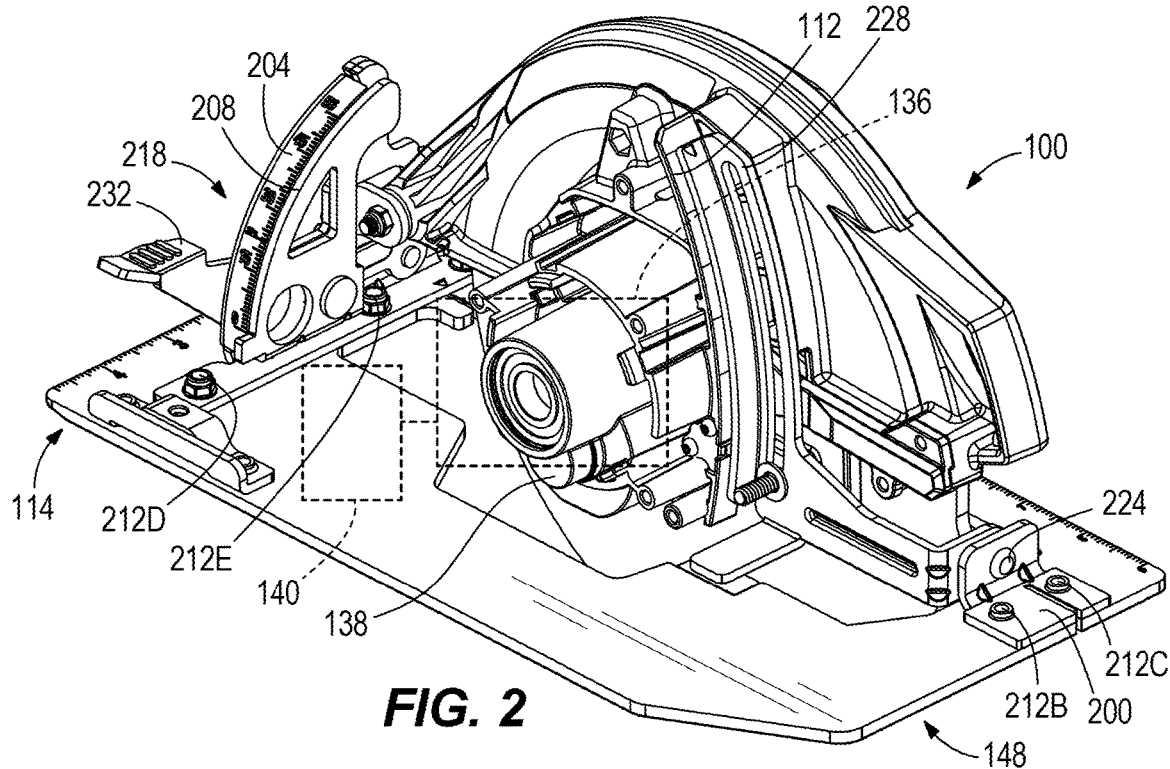
FIG. 2 is another perspective view of the circular saw of FIG. 1.

As illustrated in FIG. 2, the saw unit 112 includes an electric motor (e.g., a brushless electric direct-current motor 136) for providing torque to the blade 124, causing it to rotate. The saw unit 112 may also include a gear train or transmission 138 between the motor 136 and the blade 124 to adjust the magnitude of torque transmitted to the blade 124. In the illustrated embodiment, the saw unit 112 is powered by a removable battery pack 140 (i.e., shown in phantom lines for illustration purposes only). However, the saw unit 112 may be powered by another power source.

Figure 8:
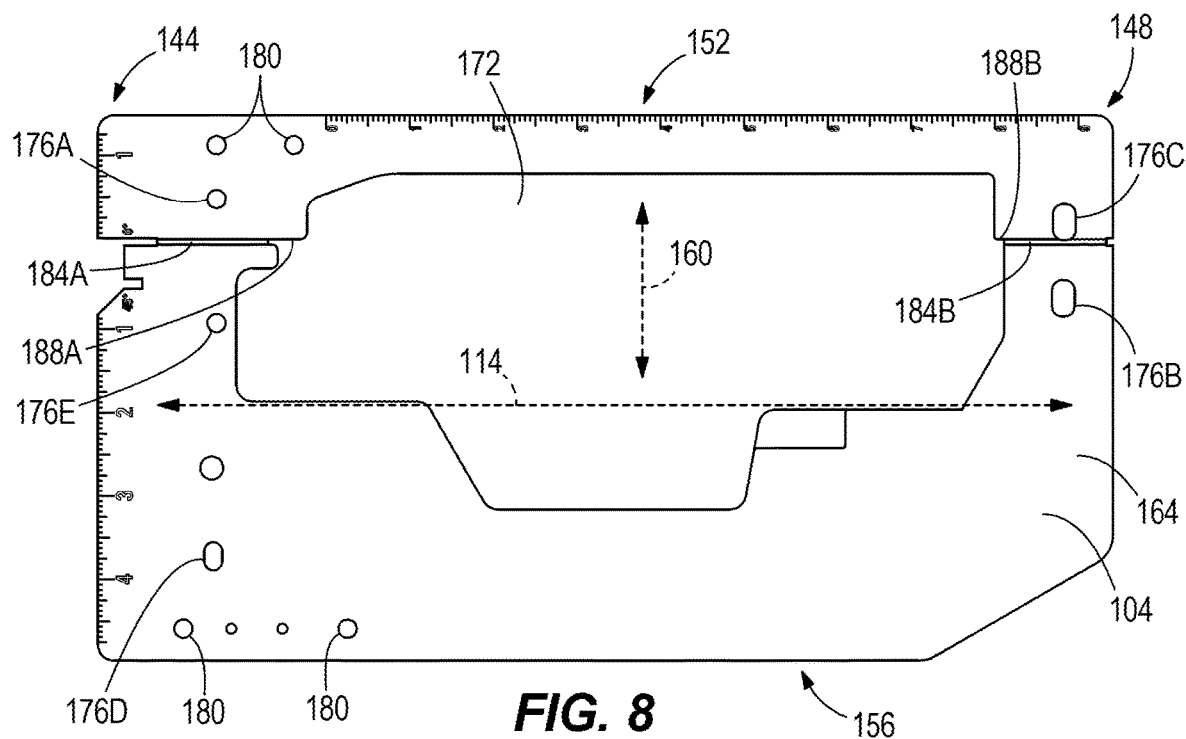
FIG. 8 is a top view of a base of the circular saw of FIG. 1.
Figure 9:
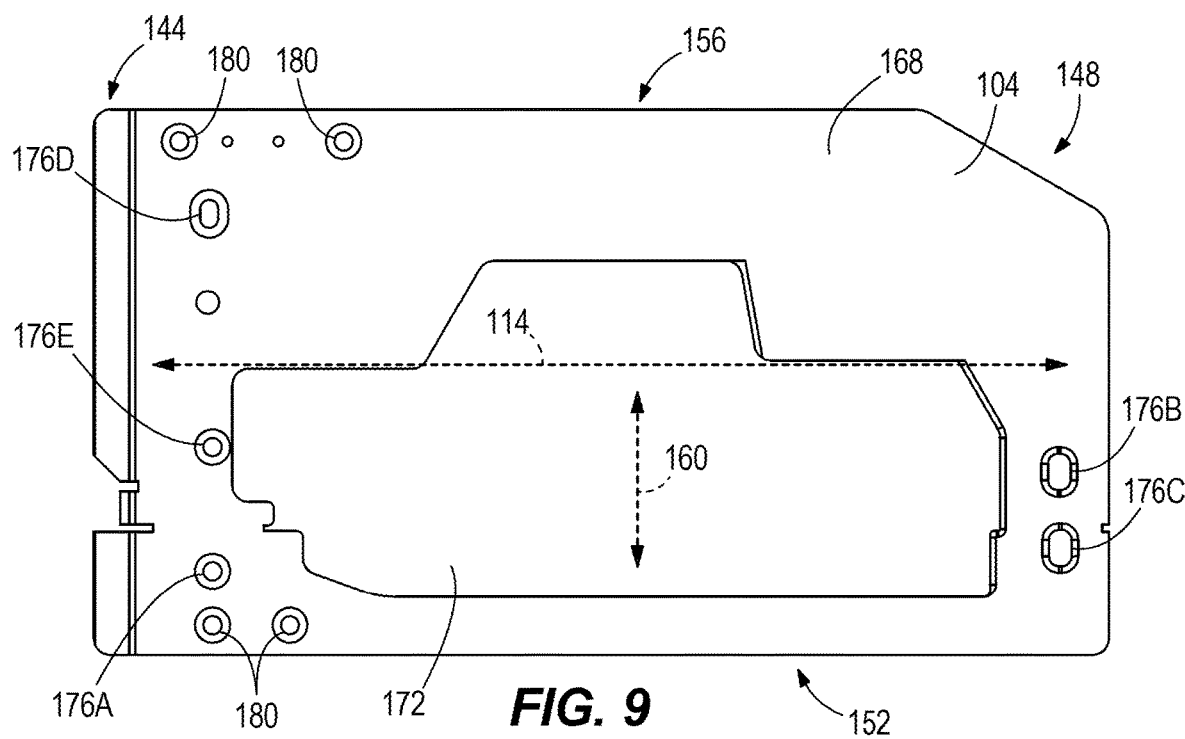
FIG. 9 is a bottom view of the base of FIG. 8.

As illustrated in FIGS. 8 and 9, the base 104 includes the front end 144, the rear end 148, a first side 152, and a second side 156. As previously mentioned, the longitudinal axis 114 extends through the front end 144 and the rear end 148 of the base 104. A lateral axis 160 extends between the first side 152 and the second side 156 of the base 104. The base 104 includes an upper surface 164 and an opposite, lower surface 168, which is placed upon and contacts the work piece W. As illustrated in FIG. 5, the lower surface 168 of the base 104 defines the base plane 128.

With continued reference to FIGS. 8 and 9, the base 104 includes an opening 172 (e.g., a large, primary, and substantially central opening) extending between the upper and lower surfaces 164, 168. The opening 172 also extends between first side 152 and the second side 156 and between the front end 144 and the rear end 148. The base 104 further includes a number of additional openings or holes 176 (e.g., secondary openings or holes), each extending through the lower surface 168 and the upper surface 164. The opening 172 permits passage of the gauge plate 116 and the blade 124 through the base 104. As will be described in detail below, the holes 176 permit attachment of the base 104 to the saw unit 112. The holes 176 are illustrated as holes 176A-176E. Some holes 176 (e.g., see 176A, 176D, and 176E) may be positioned adjacent the front end 144 of the circular saw 100. One or more holes (e.g., see holes 176D, 176B, 176C) may be configured as a slot that is elongated in a lateral direction (i.e., a direction parallel with the lateral axis 160). Some holes (see e.g., holes 176B, 176C) may be positioned adjacent the rear end 148 of the circular saw 100. In some embodiments, the slotted holes (e.g., 176B, 176C, 176D) are configured to permit adjustment of the saw unit 112 relative to the base 104. As will be described in detail below, the base 104 further includes additional holes 180 configured to retain other structures to the base 104.

With continued reference to FIGS. 8 and 9, the base 104 further includes one or more blade indicator slots 184A, 184B. A first blade indicator slot 184A may be positioned adjacent the front end 144 of the base 104 and extends in a longitudinal direction (i.e., a direction parallel with the longitudinal axis 114). The base 104 also includes a first gauge locating surface 188A, which is aligned with the first blade indicator slot 184A, that partially defines the opening 172. As illustrated in FIG. 12, the first gauge locating surface 188A is configured to abut the gauge plate 116 during assembly of the circular saw 100 to align the gauge plate 116 and thus the saw unit 112 relative to the longitudinal axis 114 of the base 104 to ensure that the blade 124, after replacing the gauge plate 116 with the blade 124, is aligned with the first blade indicator slot 184A.

In the illustrated embodiment of FIGS. 4 and 5, the first blade indicator slot 184A is visible from both the upper surface 164 and the front end 144 of the base 104. A similar, second blade indicator slot 184B and second gauge locating surface 188B (against which the gauge plate 116 is also abuttable) are adjacent the rear end 148 of the circular saw 100. However, as illustrated in FIG. 10, the second blade indicator slot 184B may be visible from only the rear end 148 of the base 104. The first and second gauge locating surfaces 188A, 188B may each be formed in the periphery of the opening 172, and thus at least partially define a portion of the opening 172 in the base 104.

Figure 3:
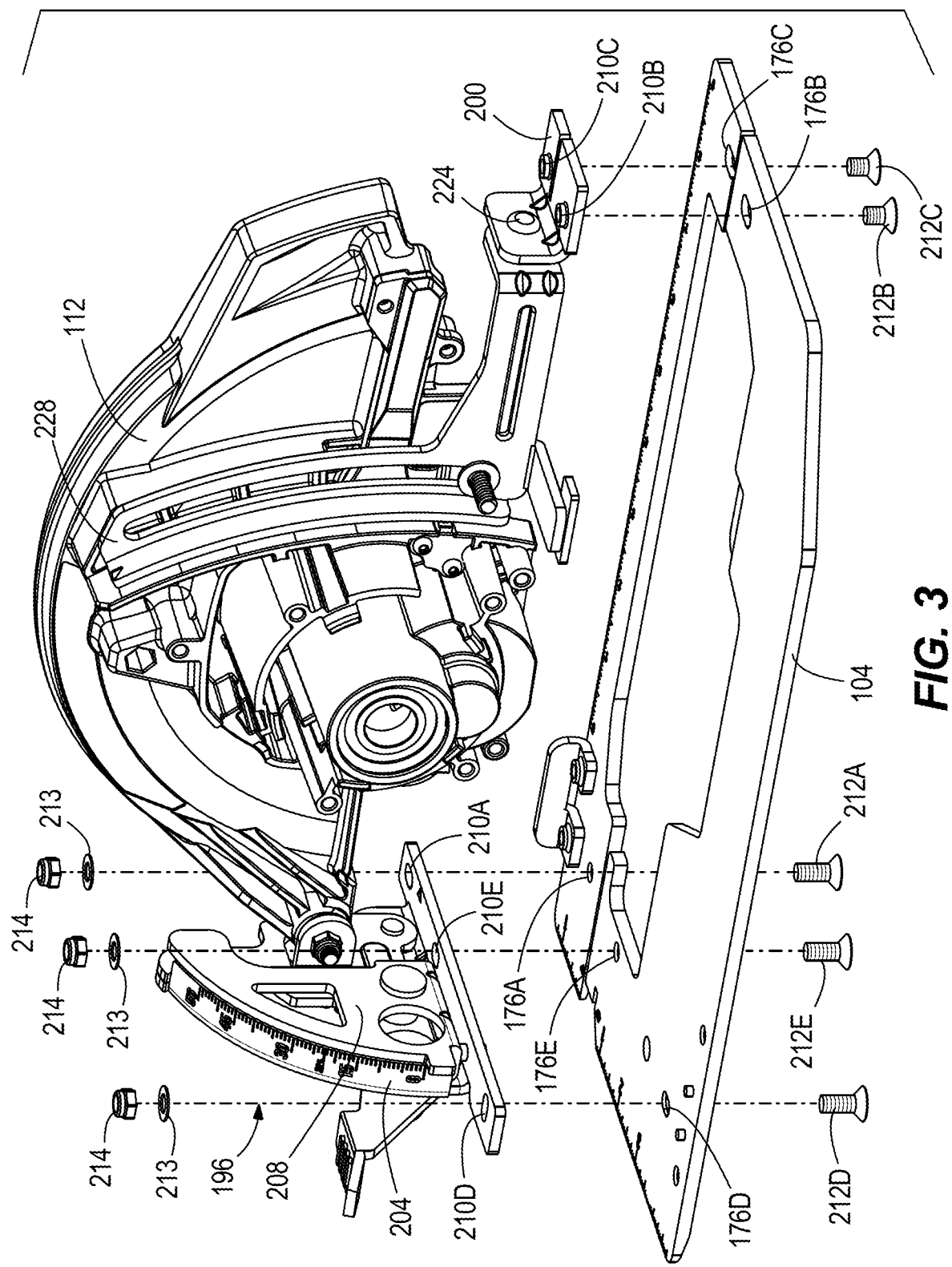
FIG. 3 is an exploded view of the circular saw of FIG. 1.
Figure 3A:
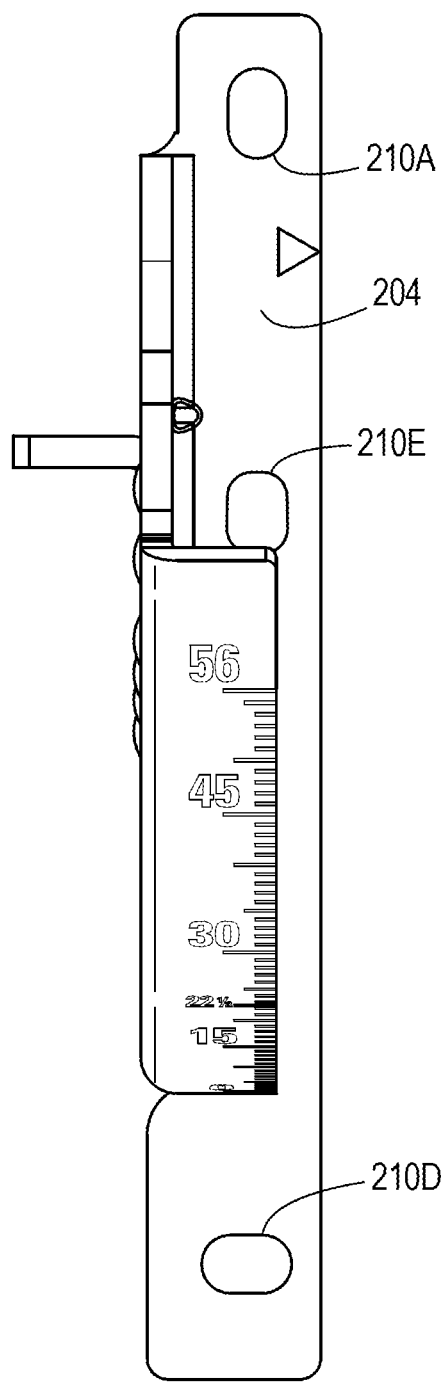
FIG. 3A is a top view of an upstanding base plate of the circular saw of FIG. 1.

With reference to FIG. 5, the circular saw 100 may permit adjustment of a bevel angle between a blade plane 192 and the vertical reference plane 132. The blade plane 192 is defined by the blade 124 when the blade 124 is secured to the saw unit 112, and is co-planar with the vertical reference plane 132 when the blade 124 is positioned at a zero-degree bevel angle (as shown in FIG. 5). With reference to FIGS. 1 and 2, the circular saw 100 includes a front bevel angle adjustment bracket 196 and a rear bevel angle adjustment bracket 200 to adjust the bevel angle of the blade 124. The front bevel angle adjustment bracket 196 and rear bevel angle adjustment bracket 200 each function as a portion of the interface 108 to mount the saw unit 112 to the base 104. The front bevel angle adjustment bracket 196 includes an upstanding base plate 204 and a carriage plate 208. As shown in FIG. 3, the upstanding base plate 204 is secured to the base 104 through fasteners 212A, 212D, 212E. The fasteners 212A, 212D, 212E extend through the corresponding holes 176A, 176D, 176E in the base 104. The fasteners 212A, 212D, 212E also extend through corresponding holes 210A, 210D, 210E of the upstanding base plate 204. The holes 210A, 210D, 210E are illustrated in FIG. 3A. In the illustrated embodiment, the holes 210A and 210E are configured as slots elongated in the lateral direction. In the illustrated embodiment, the hole 210D is configured as a slot elongated in the longitudinal direction. The carriage plate 208 is pivotably coupled to the base plate 204 by a pin 220 (FIG. 1) and also fastened to the saw unit 112. The upstanding base plate 204 includes an arcuate slot 216 through which a front bevel lock 218 extends (FIG. 5). As described in detail below, the front bevel lock 218 is configured to lock the bevel angle between the base 104 and the saw unit 112 by releasably clamping the upstanding base plate 204 to the carriage plate 208.

Figure 3B:
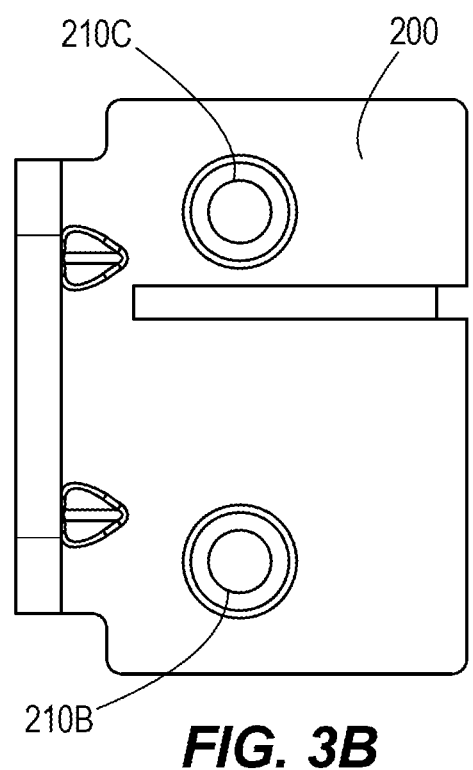
FIG. 3B is a top view of a rear bevel angle adjustment bracket of the circular saw of FIG. 1.
Figure 6:
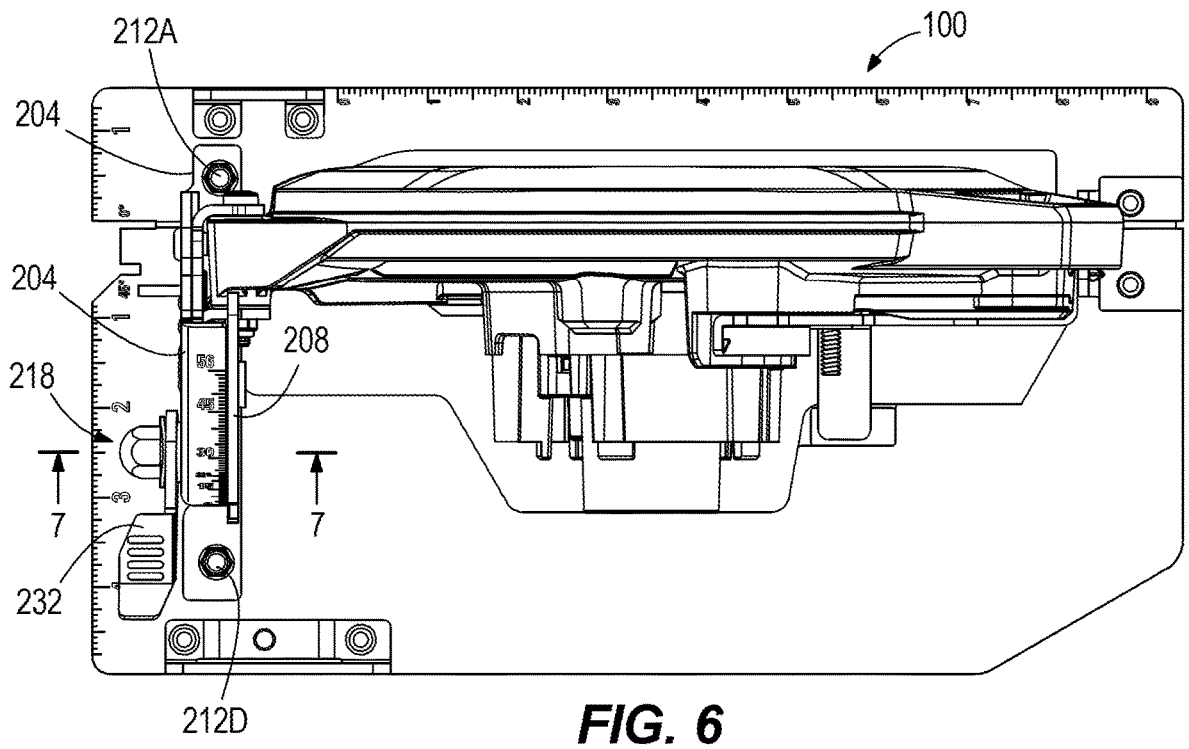
FIG. 6 is a top view of the circular saw of FIG. 1.

With reference to FIGS. 2 and 3, the rear bevel angle adjustment bracket 200 is secured to the base 104 through fasteners 212B, 212C. The fasteners 212B, 212C extend through the corresponding holes 176B, 176C in the base 104. The fasteners 212B, 212C also extend through corresponding holes 210B, 210C of the rear bevel angle adjustment bracket 200. The holes 210B, 210C are further illustrated in FIG. 3B. As previously mentioned, the holes 176B, 176C are configured as slots elongated in the lateral direction. In the illustrated embodiment, the holes 210B, 210C are generally circular. The rear bevel angle adjustment bracket 200 is pivotably coupled to a plunge depth scale 228 via a pin 224. The fasteners 212A-212E may include, but are not limited to, flat socket-heard cap screws that are threaded to Nylock hex nuts.

FIG. 3 illustrates the fasteners 212A-212E and corresponding washers 213 and nuts 214 in an exploded view of the circular saw 100. In the illustrated embodiment, the fasteners 212A, 212D, 212E engage corresponding washers 213 and nuts 214 to secure the upstanding bevel plate 204 to the base 104. In one embodiment, the fasteners 212B, 212C secure the rear bevel angle adjustment bracket 200 to the base 104 with threads of the fasteners 212B, 212C engaging threads of the holes 210B, 210C. The fasteners 212A-212E may connect the upstanding bevel plate 204 and the rear bevel angle adjustment bracket 200 to the base 104 by other means.

With reference to FIG. 9, the holes 176A-176E receive the fasteners 212A-212E, respectively. The holes 176A-176C and 176E are on a first lateral side (i.e., adjacent the first side 152) of the longitudinal axis 114 of the base 104. The hole 176D is on a second lateral side (i.e., adjacent the second side 156) of the longitudinal axis 114 of the base 104 opposite the first lateral side (i.e., the first side 152). The longitudinal axis 114 extends between the front end 144 and the rear end 148 of the base 104. Accordingly, the fasteners 212A-212C and 212E are located on the first lateral side (i.e., adjacent the first side 152) of the longitudinal axis 114 of the base 104. The fastener 212D is located on the second lateral side (i.e., adjacent the second side 156) of the longitudinal axis 114 of the base 104 opposite the first lateral side (i.e., the first side 152).

Figure 7:
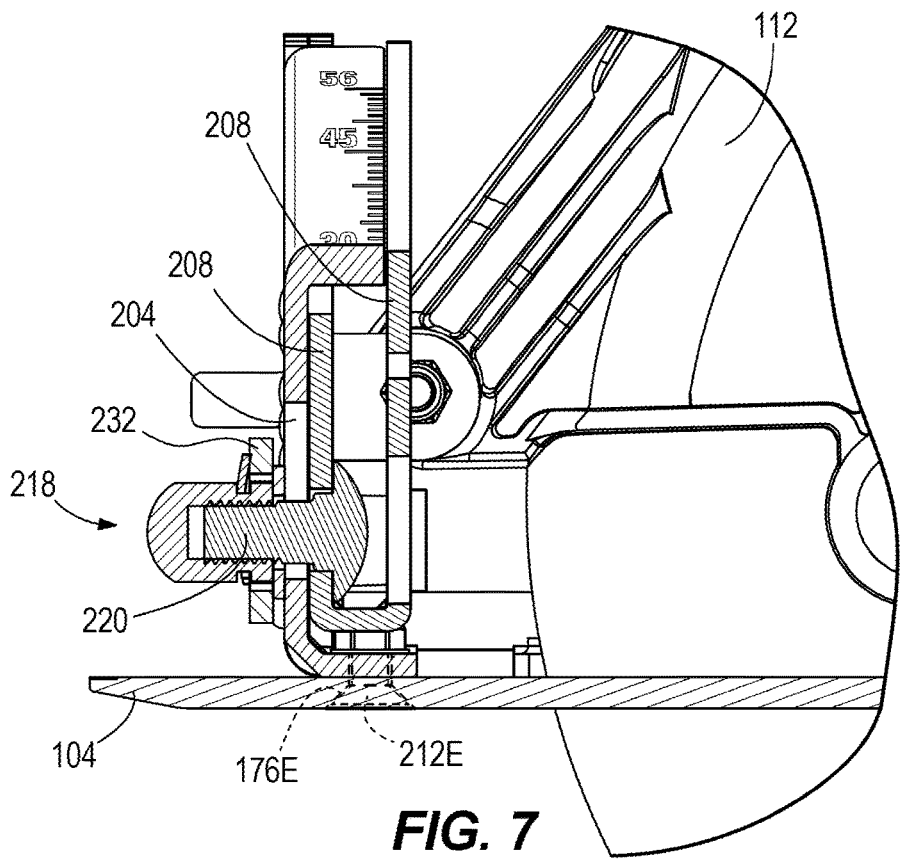
FIG. 7 is a cross-sectional view of the circular saw taken along section line 7-7 in FIG. 6.

FIG. 7 illustrates the front bevel lock 218 in detail. The front bevel lock 218 is configured as a carriage bolt 220 that extends through both the upstanding base plate 204 and the carriage plate 208. A handle 232 includes an internal nut that is threaded to the bolt. The handle 232 can be pivoted to pull the bolt towards the handle 232, thus applying a clamping force to the upstanding base plate 204 and the carriage plate 208 to lock the circular saw 10 at a desired bevel angle. To adjust the bevel angle, the handle 232 can be pivoted in an opposite direction to release the clamping force between the upstanding base plate 204 and the carriage plate 208.

The connections between the front bevel angle adjustment bracket 196, the rear bevel angle adjustment bracket 200, and the base 104 at the interface 108 permit the base 104 to be removably connected to the saw unit 112. Additionally, the connections between the front bevel angle adjustment bracket 196, the rear bevel angle adjustment bracket 200, and the base 104 are adjustable to align the saw unit 112 relative to the base 104. Such connections are either made or taken apart during the construction of the circular saw 100, replacement of one or more parts of the circular saw (such as when replacing the base 104), or re-alignment of the blade 124.

During construction of the circular saw 100, a screw tightening sequence is employed to align the saw unit 112 to the base 104. With the gauge plate 116 attached to the saw unit 112, the saw unit 112 moved to a position relative to the base 104 such that the gauge plate 116 abuts the gauge locating surfaces 188A, 188B. The screw tightening sequence is then applied to the fasteners 212A-212E. The screw tightening sequence may be repeated multiple times in rounds to slowly bring the fasteners 212A-212E to the desired torque. In some instances, the tightening sequence promotes even torquing of the fasteners 212A-212E onto the base 104. With even torque supplied to the fasteners 212A-212E, loads between the saw unit 112 and the base 104 can be efficiently distributed between the fasteners 212A-212E, allowing for a more uniform connection between the saw unit 112 and the base 104. For example, in one embodiment, the screw tightening sequence is applied in two rounds, with a first round loosely coupling the saw unit 112 to the base 104, and the second round affixing the position and orientation of the saw unit 112 relative to the base 104.

In the illustrated embodiment, the screw tightening sequence is a five-fastener tightening sequence that follows a star-like pattern to promote uniform torque being applied to the fasteners 212A-212E. First, the fastener 212A is passed through the hole 176A and loosely threaded to a corresponding nut to make a first connection between the upstanding base plate 204 and the base 104. Second, the fastener 212B is passed through the hole 176B and is loosely threaded to a corresponding nut to make a first connection between the rear bevel angle adjustment bracket 200 and the base 104. Third, the fastener 212C is passed through the hole 176C and is loosely threaded to a corresponding nut to make a second connection between the rear bevel angle adjustment bracket 200 and the base 104. Fourth, the fastener 212D is passed through the hole 176D and is loosely threaded to a corresponding nut to make a second connection between the upstanding base plate 204 and the base 104. Finally, the fastener 212E is passed through the hole 176E. The fasteners 212A-212E are then tightened, in the same order as described above, to secure the bevel angle adjustment brackets 196, 200 to the base 104.

As previously mentioned, before the screw tightening sequence is applied to the fasteners 212A-212E, the saw unit 112, with the gauge plate 116 attached to the saw unit 112, is moved to position the gauge plate 116 against the gauge locating surfaces 188A, 188B. Depending on the torque applied to the fasteners 212A-212E, the saw unit 112 may be movable during and between rounds of the screw tightening sequence. During this movement, at least one of the front bevel angle adjustment bracket 196 and the rear bevel angle adjustment bracket 200 is moved at least partially in a lateral direction to abut the protrusion 120 with the gauge locating surface 188A. The fastener 212E is then tightened. Optionally, during a first screw tightening sequence, the fasteners 212A-212E are tightened to a less-than maximum torque. Subsequent screw tightening sequences may be then applied to achieve maximum torque to fully secure the saw unit 112 to the base 104. In instances where multiple screw tightening sequences are applied, loads between the saw unit 112 and the base 104 may be more evenly distributed amongst the fasteners 212A-212E when compared to utilizing a single screw tightening sequence. Alternatively, different screw tightening sequences may be applied to secure the saw unit 112 to the base 104. However, in each alternate screw tightening sequence, at some point, the gauge plate 116 abuts the gage locating surfaces 188A, 188B to align the saw unit 112 to the base 104.

During replacement of the base 104 of the circular saw 100, the base 104 is removed by loosening the fasteners 212A-212E. Subsequent reattachment of the saw unit 112 relative to a replacement base 104 in accordance with the aforementioned screw tightening sequence is performed.

The blade 124 of the circular saw 100 can be realigned relative to the base 104. During a realignment operation, the fasteners 212A-212E are loosened sufficiently until the base 104 is movable relative to the saw unit 112. Alternatively, the fasteners 212A-212E are fully removed from the base 104. The blade 124 is removed from the saw unit 112, and the gauge plate 116 is attached to the saw unit 112. With reference to FIG. 12, prior to tightening the fasteners 212A-212E, the saw unit 112 is moved until the protrusion 120 of the gauge plate 116 abuts the gauge locating surfaces 188A, 188B. In the illustrated embodiment, the gauge plate 116 has a protrusion 120 that abuts both the gauge locating surfaces 188A, 188B. In such an embodiment, the protrusion 120 abuts both the gauge locating surfaces 188A, 188B prior to tightening the fasteners 212A-212E. Accordingly, the gauge plate 116 can be quickly aligned in position to locate the saw unit 112 relative to the base 104. The fasteners 212A-212E are then tightened utilizing the aforementioned tightening sequence. The gauge plate 116 is then removed from the saw unit 112, and the blade 124 is reattached to the saw unit 112.

In each of these operations, a method is completed to align the saw unit 112 relative to the base 104. The saw unit 112 is loosely coupled to the base 104 via the first bevel angle adjustment bracket 196 proximate the front end 144 of the base 104 and a second bevel angle adjustment bracket 200 proximate the rear end 148 of the base 104. The gauge plate 116 is attached to the saw unit 112. The position and orientation of the saw unit 112 relative to the base 104 is laterally adjusted by sliding the first and second bevel angle adjustment brackets 196, 200 relative to the base 104 until the gauge plate 116 abuts the gauge locating surface 188A, 188B on the base 104. The first and second bevel angle adjustment brackets 196, 200 are tightened to the base 104 to affix the position and orientation of the saw unit 112 relative to the base 104. Finally, the gauge plate 116 is replaced with the blade 124.

The aforementioned operation for aligning the base 104 and the saw unit 112 is more efficient and accurate than known systems and methods for aligning known saw units with known bases. With the saw unit 112 aligned relative to the base 104 using the gauge plate 116, a simple exchange of the gauge plate 116 for the blade 124 locates the blade 124 in proper alignment with the saw unit 112 and the base 104. As such, a user can accurately align the saw unit 112 relative to the base 104 with the gauge plate 116, exchange the gauge plate 116 for the blade 124, and know that the blade 124 is aligned relative to the base 104. Accordingly, an important benefit of the aforementioned operation is the reduction of tolerance buildup between the saw unit 112 and the base 104. With the reduced tolerance buildup between the saw unit 112 and the base 104, the blade 124 can be more accurately aligned with the blade indicator slots 184A, 184B. As a result, the blade 124 can be positioned parallel to the base 104, and the blade 124 may make cuts in a workpiece in a direction parallel to translation of the base 104. While the aforementioned operation for aligning the base 104 and the saw unit 112 is completed during assembly of the circular saw 100, the aforementioned operation may also be performed during maintenance of the circular saw 100 to re-align the saw unit 112 to the base 104.

Various features of the invention are set forth in the following claims.

What is claimed is:

1. A method of aligning a saw unit and a base of a circular saw, the method comprising:
    loosely coupling the saw unit to the base via a first bevel angle adjustment bracket proximate a front end of the base and a second bevel angle adjustment bracket proximate a rear end of the base;
    attaching a gauge plate including a protrusion to an axis of rotation of the saw unit;
    laterally adjusting a position and orientation of the saw unit relative to the base by sliding the first and second bevel angle adjustment brackets relative to the base until the protrusion of the gauge plate abuts a gauge locating surface on the base;
    tightening the first and second bevel angle adjustment brackets to the base to affix the position and orientation of the saw unit relative to the base; and replacing the gauge plate with a circular saw blade.

2. The method of claim 1, wherein tightening the first and second bevel angle adjustment brackets to the base involves following a screw tightening sequence including, in order:
    tightening a first fastener to the first bevel angle adjustment bracket on a first lateral side of an opening defined by the base,
    tightening a second fastener to the second bevel angle adjustment bracket on a second lateral side of the opening,
    tightening a third fastener to the second bevel angle adjustment bracket on the second lateral side of the opening,
    tightening a fourth fastener to the first bevel angle adjustment bracket on the first lateral side of the opening, and
    tightening a fifth fastener to the first bevel angle adjustment bracket on the first lateral side of the opening.

3. The method of claim 2, wherein the first, second, and third fasteners are located on a first lateral side of a longitudinal axis of the base, and wherein the longitudinal axis extends between the front end and the rear end of the base.

4. The method of claim 3, wherein the fourth fastener is located on a second lateral side of the longitudinal axis, and wherein the fifth fastener is located on the first lateral side of the longitudinal axis.

* * * * *